United States Patent
Franke et al.

(10) Patent No.: US 12,222,498 B2
(45) Date of Patent: Feb. 11, 2025

(54) METHOD FOR INFLUENCING LIGHT BEAMS IN THE INTERIOR OF A MOTOR VEHICLE, AND MOTOR VEHICLE FOR CARRYING OUT THE METHOD AND MIRROR BANK FOR SUCH A MOTOR VEHICLE

(71) Applicant: Volkswagen Aktiengesellschaft, Wolfsburg (DE)

(72) Inventors: Stefan Franke, Meinersen (DE); Claudia Krefter-De Beer, Wolfsburg (DE); Klaus Zander, Hoetensleben (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 620 days.

(21) Appl. No.: 17/474,823

(22) Filed: Sep. 14, 2021

(65) Prior Publication Data
US 2021/0405364 A1 Dec. 30, 2021

Related U.S. Application Data

(63) Continuation of application No. PCT/EP2020/056079, filed on Mar. 6, 2020.

(30) Foreign Application Priority Data

Mar. 14, 2019 (DE) .................. 10 2019 203 500.0

(51) Int. Cl.
*B60K 35/00* (2024.01)
*G02B 27/01* (2006.01)
(Continued)

(52) U.S. Cl.
CPC .......... *G02B 27/0101* (2013.01); *B60K 35/00* (2013.01); *B60K 35/23* (2024.01);
(Continued)

(58) Field of Classification Search
CPC ................ B60K 35/00; B60K 2360/33; B60K 2360/334; B60K 35/23; B60K 2360/332;
(Continued)

(56) References Cited

U.S. PATENT DOCUMENTS

| 4,311,365 A | 1/1982 | Tsuda et al. |
| 5,202,668 A | 4/1993 | Nagami |

(Continued)

FOREIGN PATENT DOCUMENTS

| CN | 1777837 A | 5/2006 |
| CN | 103163711 A | 6/2013 |

(Continued)

OTHER PUBLICATIONS

Japanese Office Action dated Nov. 25, 2022 in corresponding application 2021-551962.
(Continued)

*Primary Examiner* — Ryan D Howard
(74) *Attorney, Agent, or Firm* — Muncy, Geissler, Olds & Lowe, P.C.

(57) ABSTRACT

A method for influencing light beams in the interior of a motor vehicle. The light beams come from the direction of a mirror bank associated with a head-up display. Different approaches are provided for providing an enhanced display option and simultaneously reducing a dazzling of a vehicle occupant by unwanted reflections. The light beams are generated in the mirror bank, wherein some of the generated light beams are blocked in the region of the mirror bank in
(Continued)

such a way that a particular keep-clear region is created into which reflected light beams can no longer enter, or generated light beams in the region of the mirror bank are directed without reflection onto a particular viewing region, or the generated light beams in the region of the mirror bank are polarised and only such polarised portions of the light beams that cause no or only negligible reflections exit the mirror bank.

6 Claims, 5 Drawing Sheets

(51) Int. Cl.
 *B60K 35/23* (2024.01)
 *B60K 35/81* (2024.01)
(52) U.S. Cl.
 CPC .......... *B60K 35/81* (2024.01); *B60K 2360/23* (2024.01); *B60K 2360/25* (2024.01); *B60K 2360/60* (2024.01); *G02B 2027/0118* (2013.01)
(58) Field of Classification Search
 CPC .............. B60K 2360/60; B60K 35/425; B60K 35/415; G02B 27/0101
 See application file for complete search history.

(56) References Cited

U.S. PATENT DOCUMENTS

| | | |
|---|---|---|
| 9,638,919 B1 | 5/2017 | Wunderlich |
| 10,766,363 B2 | 9/2020 | Takamatsu et al. |
| 2007/0216836 A1 | 9/2007 | Lippey |
| 2012/0162961 A1 | 6/2012 | Brandt |
| 2016/0277182 A1 | 9/2016 | Suzuki |
| 2017/0158056 A1* | 6/2017 | Takamatsu ......... G02B 27/0101 |
| 2018/0065482 A1 | 3/2018 | Yagyu et al. |

FOREIGN PATENT DOCUMENTS

| | | |
|---|---|---|
| DE | 10005198 A1 | 9/2000 |
| DE | 102006019870 A1 | 11/2007 |
| DE | 102009020616 A1 | 11/2010 |
| DE | 102009031042 A1 | 1/2011 |
| DE | 102010032998 A1 | 2/2012 |
| DE | 102014019039 A1 | 6/2016 |
| DE | 102014019160 A1 | 6/2016 |
| EP | 0064865 A1 | 11/1982 |
| JP | 2002187491 A | 7/2002 |
| JP | 2016060250 A | 4/2016 |
| KR | 20160074576 A | 6/2016 |
| WO | WO2010089026 A1 | 8/2010 |
| WO | WO2017017160 A1 | 2/2017 |

OTHER PUBLICATIONS

International Preliminary Report on Patentability dated Aug. 25, 2021 in corresponding application PCT/EP2020/056079.
Korean Patent Decision letter dated May 30, 2023 in corresponding application 1020217032440.
International Search Report dated Jun. 26, 2020 in corresponding application dated PCT/EP2020/056079.
European Office Action dated Feb. 2, 2024 in corresponding application 20713190.5.
Chinese Office Action dated Mar. 26, 2024 in corresponding application 202080020733.5.

\* cited by examiner

METHOD FOR INFLUENCING LIGHT BEAMS IN THE INTERIOR OF A MOTOR VEHICLE, AND MOTOR VEHICLE FOR CARRYING OUT THE METHOD AND MIRROR BANK FOR SUCH A MOTOR VEHICLE This nonprovisional application is a continuation of International Application No. PCT/EP2020/056079, which was filed on Mar. 6, 2020 and which claims priority to German Patent Application No. 10 2019 203 500.0, which was filed in Germany on Mar. 14, 2019, and which are both herein incorporated by reference.

BACKGROUND OF THE INVENTION

Field of the Invention

The present invention relates to a method for influencing light beams in the passenger compartment of a motor vehicle. The invention also relates to a motor vehicle for carrying out the method and to a mirror bank for such a motor vehicle.

Description of the Background Art

Methods are known from patents DE 10 2014 019 160 A1 (which corresponds to US 2017/0131548), DE 10 2014 019 039 A1, and DE 10 2010 032 998 A1, which are incorporated herein by reference Thus, DE 10 2014 019 160 A1 presents a method for reducing reflection when operating a head-up display of a motor vehicle. In concrete terms, the head-up display has a cover element and a dimming element for dimming a deflected light beam of ambient light. A control device determines an optical path of the deflected light beam, detects a current position and an orientation of the dimming element, and determines a region around an eye point of a vehicle occupant to be kept clear of the deflected light beam. If the deflected light beam leads through the region to be kept clear, the control device generates a control signal for adjusting a position of the dimming element in which the deflected light beam is dimmed.

In DE 10 2014 019 039 A1, a head-up display for a motor vehicle is described with a transparent cover plate and with a projection unit for projecting an image onto a projection surface. The projection surface is located on the windshield of the motor vehicle. The cover plate is designed to deflect extraneous light (such as sunlight) impinging on the display device away from the projection unit. In addition, the cover plate is constituted such that light impinging on it from outside is deflected to an absorption surface of an absorption plate. A solar cell arrangement is present at the absorption surface.

Finally, a head-up display for a motor vehicle can be learned from DE 10 2010 032 998 A1, via which an image to be displayed can likewise be projected onto a windshield. A projection device of the head-up display has a semitransparent cover that is oriented toward the windshield and that is designed to reflect extraneous light striking the cover from outside onto an absorber surface. The absorber surface is formed by an inner coating of the windshield.

SUMMARY OF THE INVENTION

It is therefore an object of the present invention to provide a method for influencing light beams in the passenger compartment of a motor vehicle with which enhanced display options for a vehicle occupant can be realized on the one hand, but with which a dazzling by reflections of light beams can also be kept in check at the same time, despite the enhanced display options.

An additional object of the invention is to provide a motor vehicle for carrying out the method. Finally, the invention is also intended to make available a suitable mirror bank for installation in such a motor vehicle.

In combination with a head-up display, a mirror bank serves, in particular, to protect a vehicle occupant from unwanted reflections. Such reflections can arise, for example, through sunlight that is reflected at the cover of the head-up display and/or at the windshield and impinges on a vehicle occupant's eye. The cover of the head-up display in this case is curved such that the light beams impinging on the cover from outside always impinge on the mirror bank. The interior of the mirror bank is usually designed to be matt black in order to absorb incident light. The mirror bank thus serves as a light trap for incident light.

The invention is based, firstly, on a method for influencing light beams in the passenger compartment of a motor vehicle. The light beams in this case enter the passenger compartment coming from the direction of a mirror bank associated with a head-up display.

The method is designed according to the invention such that the light beams are generated in the mirror bank, wherein some of the generated light beams in the region of the mirror bank are blocked. This occurs in such a manner that a specific keep-clear region is created into which light beams generated in the mirror bank and reflected at a windshield and/or at a cover of the head-up display can no longer enter, or wherein the generated light beams in the region of the mirror bank are oriented. The orientation occurs in such a manner that the light beams can only enter a specific viewing region with no reflection at a windshield and/or at a cover of the head-up display, or wherein the generated light beams in the region of the mirror bank are polarized. The polarization of the light beams occurs in such a manner that only those polarized components of the light beams that are not reflected or are scarcely reflected at a reflection surface, as for example the windshield of a motor vehicle, and/or at a light-transmitting cover of the head-up display, but instead are transmitted, emerge from the mirror bank.

As a result of the abovementioned alternative approaches, it is possible to significantly reduce a dazzling of a vehicle occupant, in particular the vehicle occupants in front, caused by reflections of light beams at the windshield and/or at the cover of a head-up display.

The abovementioned keep-clear region is preferably formed as a radius about an eye point of a front vehicle occupant. Such a keep-clear region can be approximately 20 centimeters, for example. The abovementioned viewing region can be formed analogously.

In an improvement of the method, it is proposed that the light beams in the region of the mirror bank are oriented in such a manner that, viewed in a vertical plane, a light cone with a region of approximately 10 degrees to approximately 18 degrees, preferably of approximately 12 degrees to approximately 16 degrees, is produced. Especially preferably, a light cone of approximately 14 degrees is produced.

As a result, it is possible to ensure that a dazzling of a vehicle occupant does not occur or scarcely occurs.

In this case it is useful when the light cone that is produced has a luminance distribution in which a luminance is maximal at the axis of a main direction of emission and in which the luminance decreases continuously to both sides of the main direction of emission. In particular, it is proposed that the luminance remains only in a range from one ninth to one eleventh, preferably in a range of one tenth, of the maximum of the luminance in a region of approximately 6 degrees to 8 degrees, preferably in a region of approximately 7 degrees, on both sides of the main direction of emission.

As a result of a luminance decrease, in particular large luminance decrease, created in such a manner, it is possible to significantly reduce reflections that occur due to light beams that run outside of the main direction of emission. If such reflections nevertheless occur, however, they remain barely visible because of the only low luminance outside of the main direction of emission.

As mentioned early on, it is also an intent of the invention to provide a motor vehicle for carrying out the method according to the invention. Such a motor vehicle has a windshield and, arranged below the windshield, at least one mirror bank that is associated with a head-up display.

According to the invention, at least one display device extending in the longitudinal direction of the mirror bank is now arranged in the mirror bank. Preferably the display device extends over the entire length or nearly the entire length of the mirror bank. Light beams can be emitted by the display device toward a passenger compartment of the motor vehicle, wherein the mirror bank has, on its front side facing the passenger compartment, a recess extending approximately in the longitudinal direction of the mirror bank. A light-emitting surface of the display device is embedded in the recess in such a manner that the light-emitting surface is set back at a distance with respect to front boundary lines of the recess, which is to say those facing a vehicle occupant (for example, driver), or wherein the display device has directing optics. Light beams emitted by the display device can be oriented by means of the directing optics in such a manner that they can reach a specific viewing region about an eye point of a front vehicle occupant without reflection at a windshield and/or at a light-transmitting cover of the head-up display, or wherein the display device is equipped with a polarizing filter. As a result, the light beams generated in the region of the mirror bank by the display device can be polarized in such a manner that only those polarized components of the light beams emerge from the mirror bank in the direction of the passenger compartment that are not reflected or are scarcely reflected at a reflection surface, as for example at the windshield and/or at a light-transmitting cover of the head-up display, but instead are transmitted.

If, according to an improvement, the mirror bank in the motor vehicle occupies at least a majority of a width of the windshield, then the prerequisites are created that an exceptional display device can be made available to the vehicle occupants.

Further, a mirror bank is provided that can be installed in such a motor vehicle and with which the method according to the invention can be carried out.

Such a mirror bank is characterized by a display device extending in a longitudinal direction of the mirror bank, wherein a light-emitting surface of the display device is embedded in a recess in such a manner that the light-emitting surface is set back at a distance with respect to front boundary lines of the recess, which is to say those facing a vehicle occupant such as a driver or passenger, or wherein the display device has directing optics with which light beams that can be emitted by the display device can be radiated in a specific light cone, or wherein the display device is equipped with a polarizing filter.

Preferably the display device extends over the entire length or nearly the entire length of the mirror bank.

The recess can be slot-like in design. On the one hand, this contributes to an ingenious lighting effect when the display device is activated, and on the other hand it contributes to the ability to more easily block unwanted light beams.

In a useful improvement of the mirror bank, the recess can be designed to be U-shaped in cross-section. It has a first wall, a second wall, and a bottom, wherein the bottom is formed by a light-emitting surface of the display device.

A recess can thus be formed whose cross-section is clearly defined, or in other words that has clearly defined corners or edges. This makes it significantly easier to define a desired optical path.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
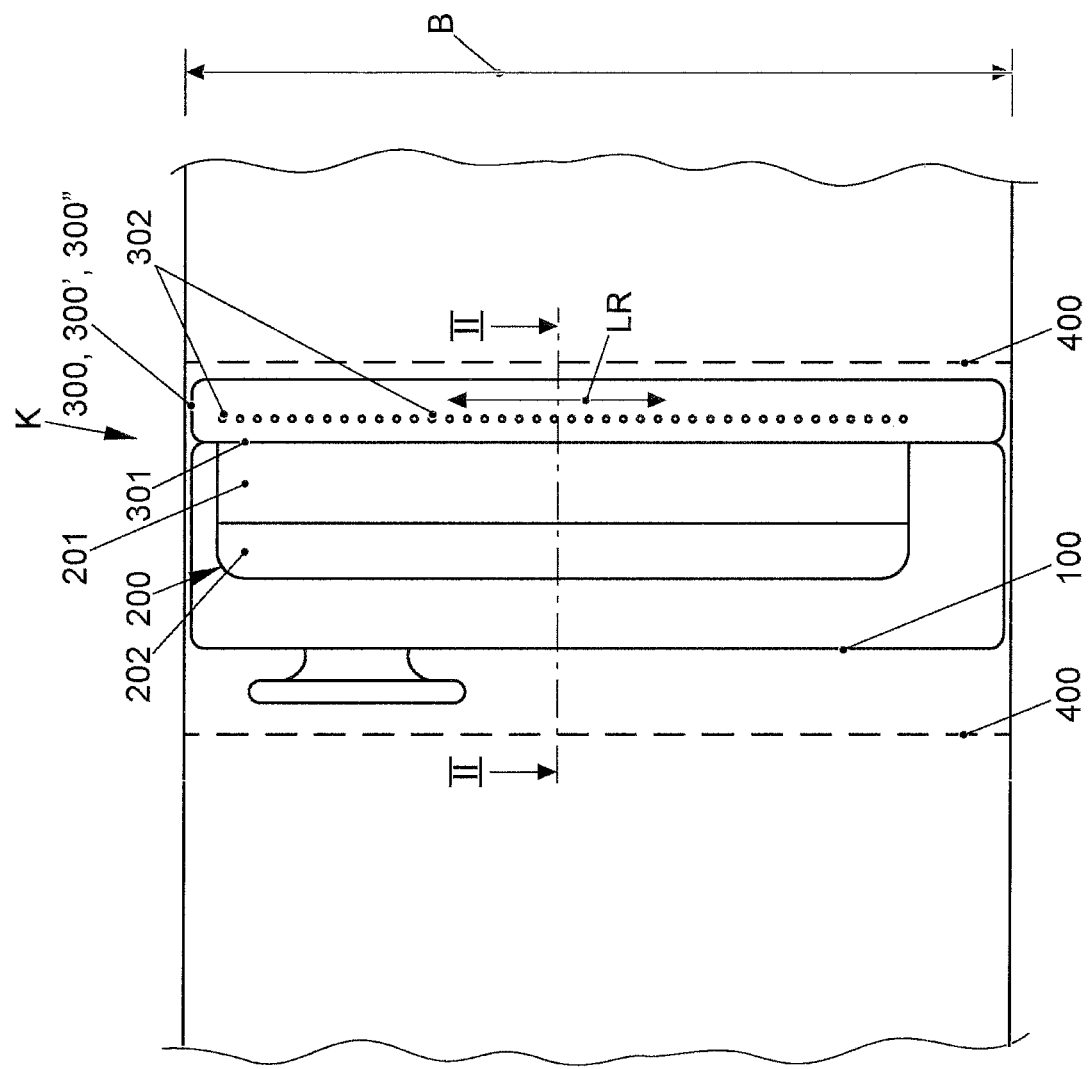
FIG. 1 shows a part of a vehicle implemented according to the invention in the region of a windshield, from above.
Figure 2A:
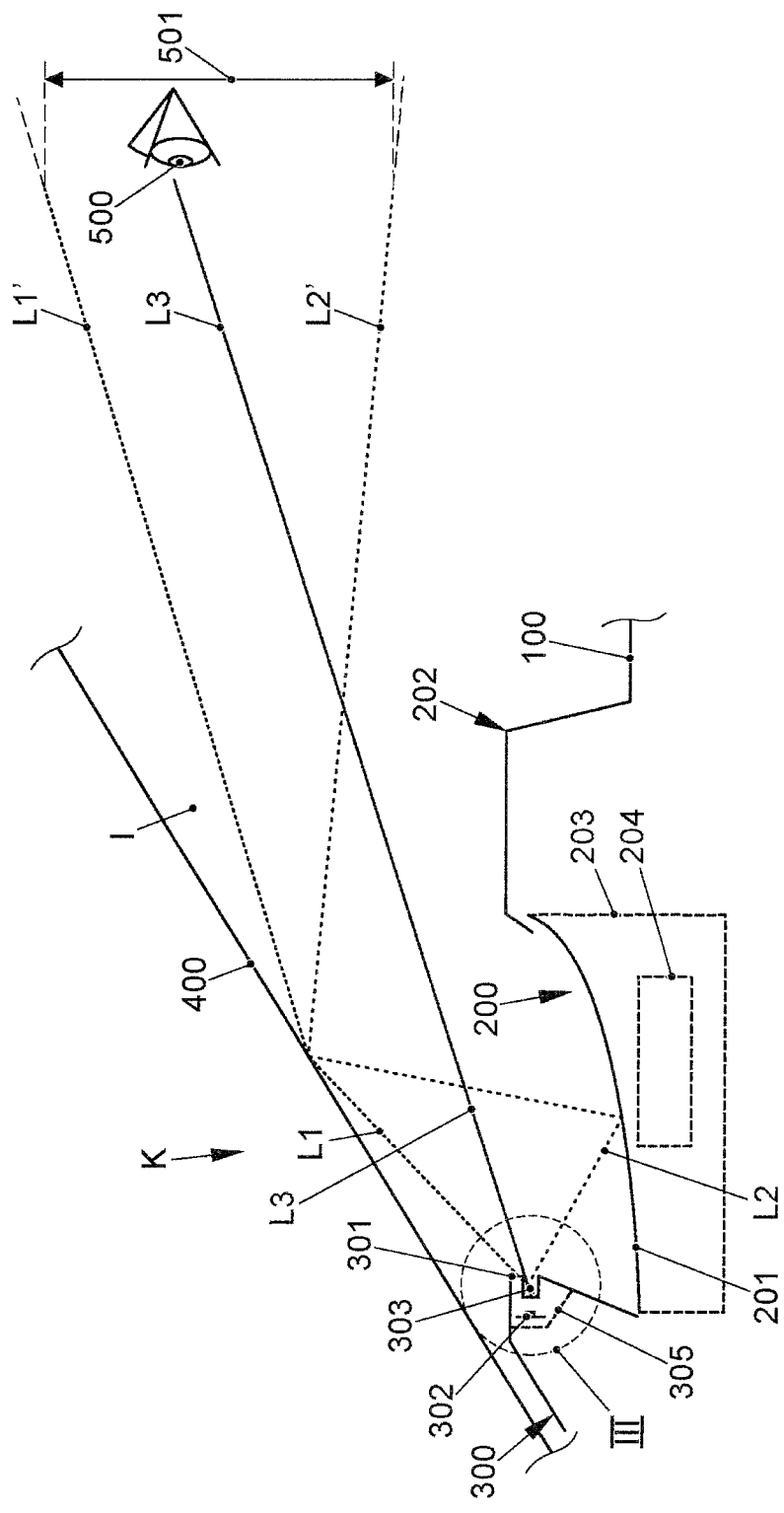
FIGS. 2a, 2b, and 2c show sectional views along section line II from FIG. 1, with mirror banks having alternative designs.

The description refers firstly to FIGS. 1 and 2a.

A motor vehicle K in the region of a windshield 400 can be seen therein. The motor vehicle K is equipped with a so-called head-up display (HUD) 200, which in the present exemplary embodiment extends across a majority of a width B of the motor vehicle K or of the windshield 400.

The head-up display 200 is used for the projection of information toward or onto the windshield 400. For this purpose, the head-up display 200 has a projection device 204 that is accommodated in a housing 203 and that is covered at the top by a light-transmitting, preferably transparent, cover 201. In addition, a cover plate 202 is present for covering the head-up display 200 with respect to a vehicle occupant. The head-up display 200 is embedded in an instrument panel 100.

Associated with the head-up display 200 is a mirror bank 300, which is arranged in front of the head-up display 200 and is immediately adjacent to the windshield 400.

The cover 201 is curved in design and, in addition to protecting the interior of the head-up display 200, serves to direct extraneous light (e.g., sunlight) impinging on the cover 201 toward the mirror bank 300. The mirror bank 300 absorbs the light nearly completely, which is to say is designed as a mirror trap. The mirror bank 300 itself extends over the entire or nearly the entire width B of the windshield 400 in a longitudinal direction LR.

All that is shown of a front vehicle occupant (e.g., vehicle driver) is an eye point 500. In addition, it can be seen that a slot-like recess 303 is located in a front side 301 of the mirror bank 300 facing the vehicle occupant.

The slot-like recess 303, in turn, extends in the longitudinal direction LR of the mirror bank 300 over the entire or nearly the entire length thereof. The recess 303 is arranged in the region of a display device 305 embedded in the mirror bank 300 or is a part of the display device 305.

Information, for example in the form of animations, can be transmitted to a vehicle occupant by means of a multiplicity of lamps 302 arranged next to one another horizontally, which preferably are implemented as light-emitting diodes. A device for appropriate driving of the lamps 302 is not shown in detail. The driving can take place as a function of specific driving and operating states of the motor vehicle K.

By way of example, light beams L1, L2, and L3 are shown that are generated or can be generated by the display device 305 or by its lamps 302. Starting from the display device 305, in particular from the slot-like recess 303, these beams arrive in the direction of a passenger compartment I of the motor vehicle K.

Thus, the light beam L3 demonstrates a light beam impinging directly on the eye point 500, which consequently means a direct view of the display device 305 for the vehicle occupant. This is desirable.

The light beam L1 demonstrates a light beam that is reflected once at the windshield 400 and then continues on as reflected light beam L1' toward the vehicle occupant. The light beam L2 demonstrates a light beam that is reflected first at the cover 201 in the direction of the windshield 400, then again at the windshield 400, and finally travels onward toward the vehicle occupant as multiply reflected light beam L2'. It is not desirable for such singly or multiply reflected light beams to reach the eye point of the vehicle occupant.

This is why the slot-like recess 303 is designed in such a way that such undesirable optical paths cannot enter a keep-clear region 501 about the eye point 500 of the vehicle occupant and dazzle the occupant. The optical paths of the light beams L1' and L2' represent precisely the limit within which no other light beams enter the keep-clear region 501.

The present technical solution therefore does not, in particular, serve to completely avoid undesirable single and multiple reflections. Instead, the solution is intended to limit only those reflections of light beams generated in the display device 305 that would impinge on the keep-clear region 501 in the absence of the slot-like recess 303.

Figure 3:
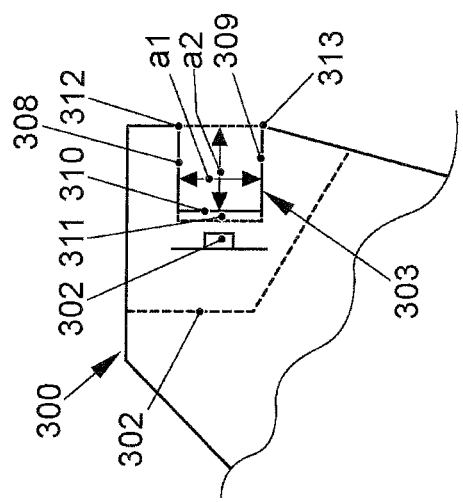
FIG. 3 shows a detail view in accordance with detail III from FIG. 2a, and FIG. 4 shows a possible luminance distribution of a light cone such as is generated in FIG. 2b.

The region of the mirror bank 300 around the slot-like recess 303 is shown in detail in cross-section by means of FIG. 3. The recess 303 extends horizontally from the front side 301 inward toward the mirror bank 300. In particular, the cross-section of the slot-like recess 303 is designed to be rectangular or U-shaped, with an upper wall 308, a lower wall 309, and with a bottom 310 of the recess 303.

In the present solution, the bottom 310 of the recess 303 is formed by a light-emitting surface 311 of the display device 305, which is merely indicated. The light-emitting surface 311 is thus set back at a distance a1 with respect to the front side 301 or front boundary lines 312, 313 of the recess 303, and consequently is embedded in the mirror bank 300. The height of the slot-like recess 303, which is to say a distance a2 between the walls 308 and 309, should be dimensioned such that the light-emitting surface 311 is still sufficiently visible to a vehicle occupant. The distance a2 can be several millimeters, for example. The distance a1 in this case should be set or optimized such that the optical paths that impinge on the passenger compartment I cannot impinge on the said keep-clear region 501 with the said single and multiple reflections.

In addition, the walls 308, 309 and also the bottom 310 of the recess 303, as well as the mirror bank 300 itself, are made of a dark, matt material or coated accordingly in order to limit reflections to a minimum.

Figure 2B:
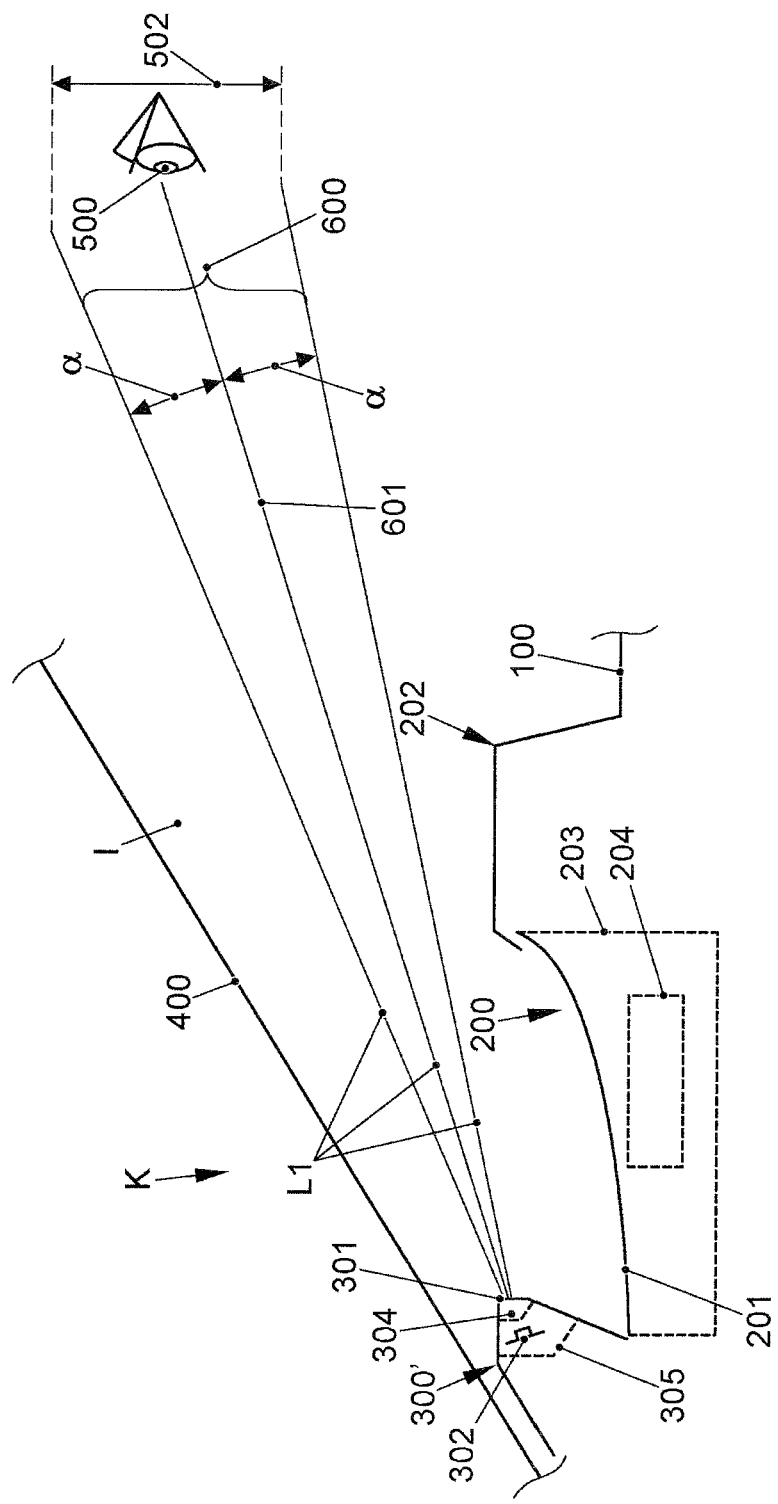

On the basis of FIG. 2b, an alternative solution is now described in which the motor vehicle K is equipped with a mirror bank 300' unlike in the preceding solution. Unlike the mirror bank 300, the mirror bank 300' is not equipped with a slot, but instead the display device 305 is provided with directing optics 304 downstream of the lamps 302.

Light beams L emerging from the display device 305 are oriented in the direction of a viewing region 502 by the directing optics 304. In particular, the multistage directing optics, which preferably is formed of multiple lenses and/or collimators, generate a light cone 600 that has a beam angle α of preferably approximately 7 degrees on all sides of a main direction of emission 601. In this case, the main direction of emission 601 is oriented approximately toward an eye point 500 of a vehicle occupant with average height. The said viewing region 502 is reproduced well by the total angular range of the light cone 600 of approximately 14 degrees.

Figure 4:
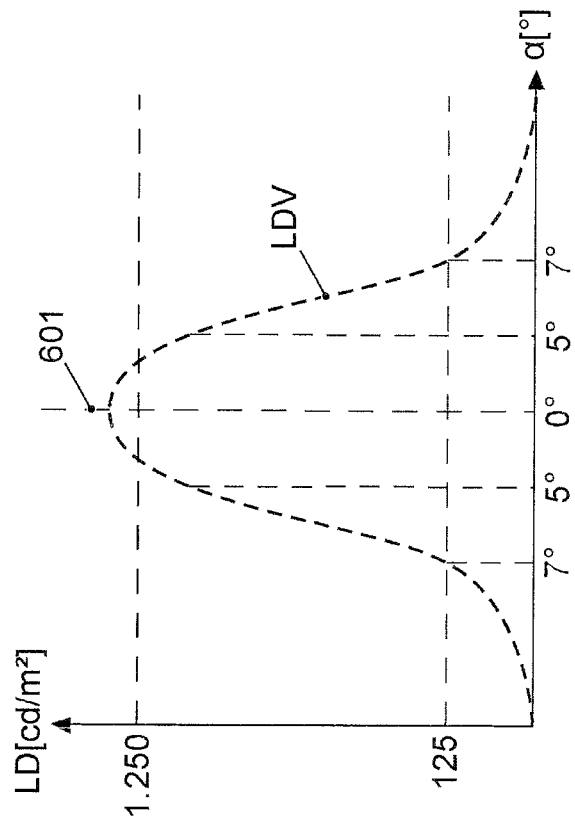

As is shown with the help of FIG. 4, the light cone 600 has a large luminance decrease. Thus, a luminance LD is plotted over the beam angle α. The light cone 600 has a luminance distribution LDV, the maximum value of which is at a beam angle α of 0 degrees, which is to say in the main direction of emission 601.

The luminance LD decreases to significantly lower than the maximum value of the luminance LD at a beam angle α of as little as 5 degrees divergence from the main direction of emission 601, and drops to even less than one tenth the maximum luminance LD at a beam angle α of approximately 7 degrees divergence from the main direction of emission 601. On account of this large luminance decrease, even though reflections of light beams do still occur outside of the light cone 600, they are barely perceptible for a vehicle occupant because of the extremely low luminance.

Figure 2C:
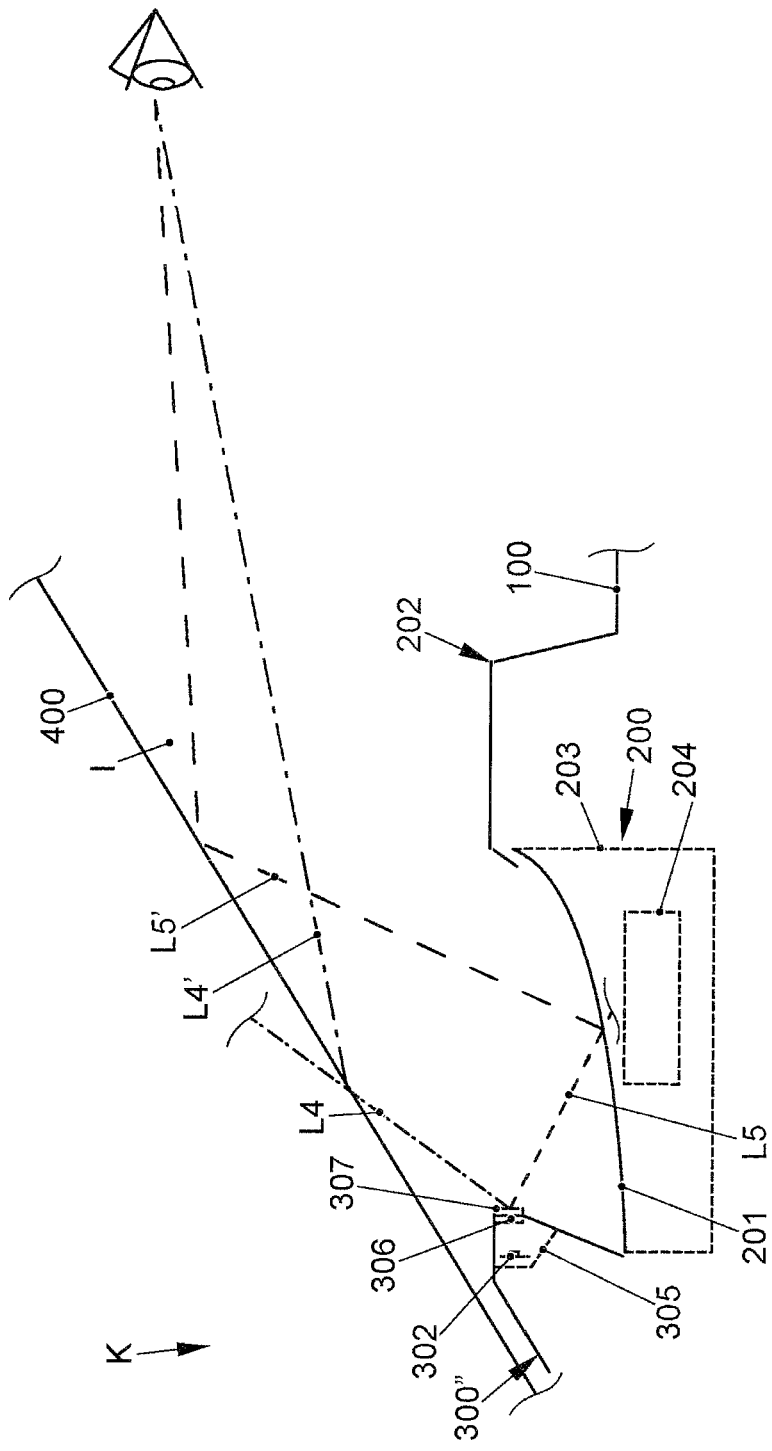

Finally, yet another solution approach shall be described on the basis of FIG. 2c. In this solution approach, the motor vehicle K has a mirror bank 300". Unlike the mirror bank 300 from the first solution approach described, the mirror bank 300" has no slot-like recess, but instead is provided with a display device 305 that has a light-emitting surface 306 with a polarizing filter 307.

It should be noted that both the display device 305 of the mirror bank 300' and the display device 305 of the mirror bank 300" have a light-emitting surface, which, like the light-emitting surface 311 of the mirror bank 300, is designed in the manner of a line or a strip and extends horizontally in the longitudinal direction LR of the mirror bank.

In the case of the mirror bank 300", the light-emitting surface 306 is additionally covered with the polarizing filter 307. The polarizing filter 307 can be designed in the manner of a film and stuck onto the light-emitting surface 306, for example.

The polarizing filter 307 now has the result that light beams generated by the lamps 302 are filtered in such a manner that they have only one remaining polarization component. To be specific, only the polarization component of the generated light beams that is not reflected or is scarcely reflected at reflection surfaces, but instead passes through, is allowed through by the polarizing filter 307.

Thus, two light beams L4 and L5 filtered by the polarizing filter 307 are shown by way of example in the figure. The light beams L4 and L5 are filtered in such a manner that they pass through the reflection surface essentially without reflection upon striking the windshield 400 (light beam L4) or upon striking the cover 201 (light beam L5). A component of residual reflection of the light beams that still remains (see L4' and L5') is so small that it is no longer perceived as problematic upon striking an eye point 500 of a vehicle occupant.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for influencing light beams in a passenger compartment of a motor vehicle, wherein the light beams enter the passenger compartment coming from a direction of a mirror bank associated with a head-up display, the method comprising:
    generating the light beams in the mirror bank,
    wherein:
        a portion of the generated light beams in a region of the mirror bank, that are reflected at a windshield and/or at a cover of the head-up display, are blocked such that a specific keep-clear region is created into which the portion of the generated light beams no longer enter, the keep-clear region being associated with an eye point of the motor vehicle driver, such that, with respect to a light transmission direction, the keep-clear region is located downstream of points at which the portion of the generated light beams were reflected at the windshield and/or at the cover of the head-up display; or
        the generated light beams in the region of the mirror bank are oriented such that the generated light beams only enter a specific viewing region with no reflection at a windshield and/or at a cover of the head-up display; or
        the generated light beams in the region of the mirror bank are polarized in such that only polarized components of the generated light beams that are not reflected at a windshield and/or at a light-transmitting cover of the head-up display, but instead are transmitted, emerge from the mirror bank,
    wherein the generated light beams in the region of the mirror bank are oriented such that, viewed in a vertical plane, a light cone with a region of 10° to 18°, 12° to 16°, or 14° is produced, and
    wherein the light cone that is produced has a luminance distribution in which a luminance is maximal at an axis of a main direction of emission and in which the luminance decreases continuously to both sides of the main direction of emission.

2. The method according to claim 1, wherein the luminance remains only in a range from one ninth to one eleventh of the maximum of the luminance in a region of 6° to 8° to the sides of the main direction of emission.

3. A motor vehicle, the motor vehicle comprising:
    a windshield; and
    at least one mirror bank arranged below the windshield, the at least one mirror bank being associated with a head-up display;
    at least one display device that extends in a longitudinal direction of the at least one mirror bank is arranged in the at least one mirror bank, the at least one display device adapted to emit light beams toward a passenger compartment of the motor vehicle,
    wherein:
        the at least one mirror bank has, on a front side facing the passenger compartment, a recess extending in the longitudinal direction of the at least one mirror bank, and a light-emitting surface of the at least one display device is embedded in the recess such that the light-emitting surface is set back at a distance with respect to front boundary lines of the recess, or
        the at least one display device has directing optics, or
        the at least one display device is equipped with a polarizing filter, and
    wherein the at least one mirror bank occupies at least a majority of a width of the windshield.

4. A mirror bank for a motor vehicle, the mirror bank comprising:
    a display device extending in a longitudinal direction of the mirror bank and being arranged in the mirror bank, the display device adapted to emit light beams toward a passenger compartment of the motor vehicle,
    wherein:
        the mirror bank has, on a front side facing the passenger compartment, a recess extending in the longitudinal direction of the mirror bank, and a light-emitting surface of the display device is embedded in the recess such that the light-emitting surface is set back at a distance with respect to front boundary lines of the recess, or
        the display device has directing optics with which light beams that are adapted to be emitted by the display device are radiated in a specific light cone, or
        the display device is equipped with a polarizing filter,
    wherein the mirror bank is arranged below a windshield of the motor vehicle and is associated with a head up display, and
    wherein the at least one mirror bank occupies at least a majority of a width of the windshield.

5. The mirror bank according to claim 4, wherein the recess is formed as an elongated slot.

6. The mirror bank according to claim 4, wherein the recess is U-shaped in cross-section, with a first wall, a second wall, and a bottom that is formed by a light-emitting surface of the display device.

* * * * *